May 3, 1927.
C. O. FOUNTAIN
1,627,379
AUTOMOBILE REBOUND CHECKING DEVICE
Filed Aug. 24, 1926
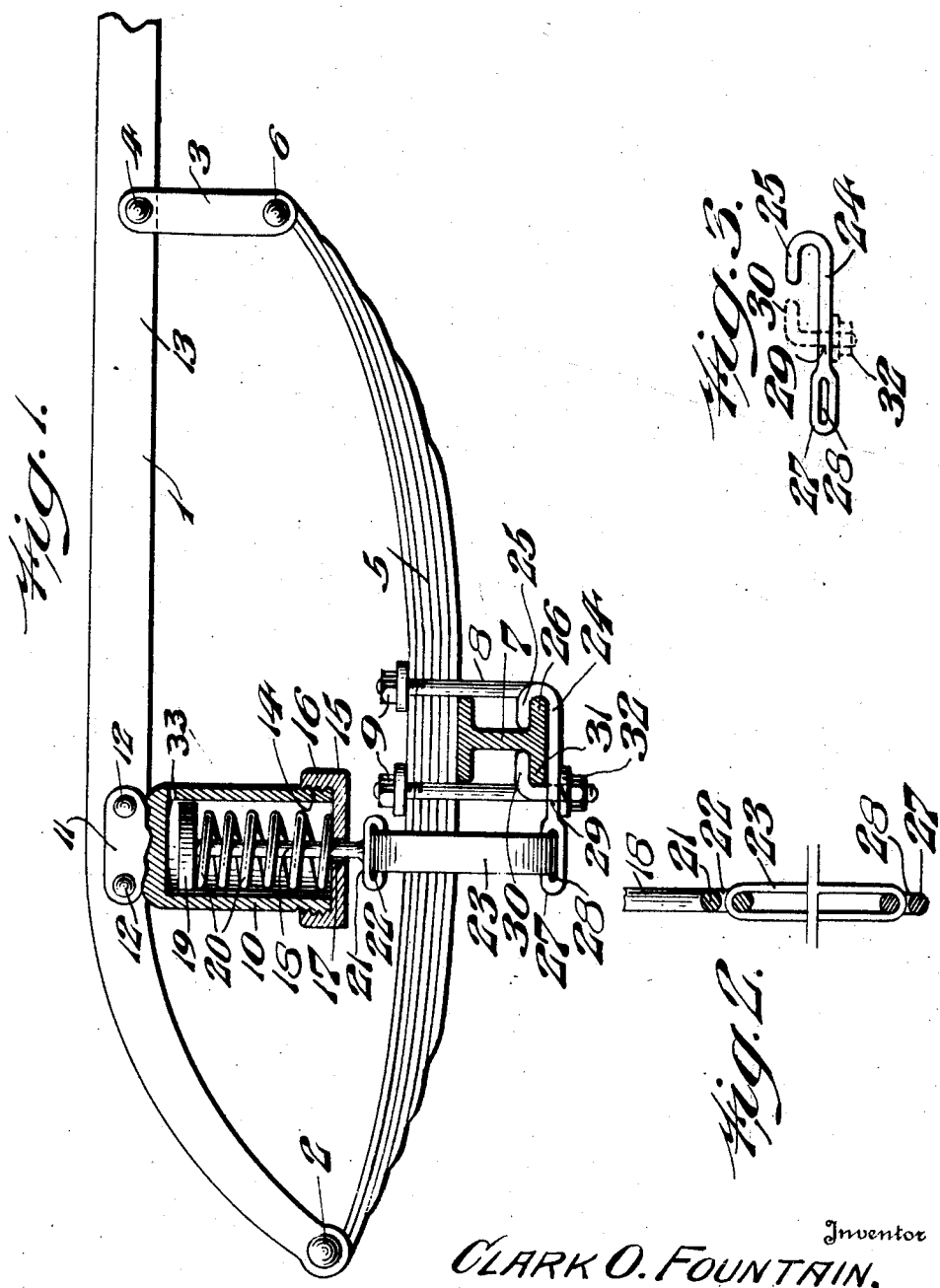
Inventor
CLARK O. FOUNTAIN, Patented May 3, 1927.

1,627,379

UNITED STATES PATENT OFFICE.

CLARK O. FOUNTAIN, OF MOORESTOWN, NEW JERSEY.

AUTOMOBILE REBOUND-CHECKING DEVICE.

Application filed August 24, 1926. Serial No. 131,167.

My invention relates to a new and useful construction in an automobile rebound checking device, whereby the rebound of an automobile, due to the prior compression or deflection of the main suspension springs, of the automobile, is greatly minimized and whereby a smoother action of said main springs is obtained, and it relates more particularly to novel details of construction of such device, whereby the application of the same to standard automobiles is greatly facilitated, and whereby the cost of manufacture of such device is reduced to a minimum.

With the above ends in view, my invention consists of a novel construction in a rebound checking device of the character stated, including an upper metallic cylindrical housing, having a vertical lug at the upper end thereof, whereby the same is rigidly secured to the longitudinal chassis member of an automobile, a lower terminal cap threadedly secured to said housing, a plunger rod extending through the lower cap member, having a terminal spring seat or disc secured to the upper end thereof, and within the housing, and having a lower terminal strap support, a helical compression spring within the housing operatively interposed between the upper terminal spring seat or disc, and the threaded lower terminal cap of the housing, a novel clamp secured to the axle of the automobile and having a laterally projecting lower strap support, and a suitable strap or belt intermediate the upper and lower strap supports, thereby to draw downwardly the plunger rod and thus to compress the helical compression spring within the housing when the automobile spring is deflected downwardly on the rebound.

Figure 1 represents a side elevation of the front portion of the chassis of an automobile, having mounted thereon a rebound checking device of my novel construction, shown in vertical section.

Figure 2 represents a section on line 2—2 of Figure 1.

Figure 3 represents a side elevation of the lower clamp of my novel construction, embodying my invention, shown detached from the axle of the automobile.

Referring to the drawings, in which like reference characters indicate like parts, 1 designates one of the longitudinal channel shaped frame members of the chassis of an automobile, having the front spring bolt 2, and the rear shackle 3, pivotally secured to the chassis by means of the bolt 4 and pivotally secured to the front spring 5 by the pivot bolts 6, the front end of said spring 5 being pivotally carried by said front spring bolt 2. The spring 5 is of the usual semi-elliptical, multiple leaf construction, and has secured to the underside thereof the transversely extending front axle 7, of any suitable conventional I beam construction by means of yokes 8 and the nuts 9.

The housing 10 of my novel device, is of generally cylindrical shape and is provided with an upper terminal upright flange 11 formed integrally therewith and suitably apertured to receive the bolts, rivets or other fastening means 12, whereby it is rigidly secured to the upright web 13 of the longitudinal channel frame members of the chassis.

The lower terminal of the housing 10 is threaded as at 14, and is adapted to receive a bottom closure or cap member 15 having the upwardly extending flange 16, threaded internally so as to engage the threaded terminal 14 of the housing, and having a central opening 17 therein.

The plunger rod 18, extends through the opening 17 in the cap 15, in axial direction, and has threadedly secured to the upper end thereof a spring seat disc or plate 19. A helical compression spring 20 of suitable dimensions is interposed between the spring seat disc 19 and the closure front member 15, so that it will be compressed when the rod 18 is drawn downwardly. The lower terminal of the plunger rod 18 carries a transversely extending strip hanger or socket 21 formed integrally therewith having a horizontal elongated opening 22 therein, adapted to receive a flat strap or the like 23.

To the front axle 7 of the automobile a bracket 24 is secured extending generally horizontally below the axle and having a terminal clamping member 25 extending parallel to the bracket member, so as to engage the rear lower flange 26 of the I shaped axle, and having a front terminal strap holder or socket 27 similar to the socket 21, carried by the rod 18 and also having the horizontal elongated aperture 28 therein for the reception of the lower portion of the strap 23.

An upright aperture 29 extending through the bracket 24 is adapted to receive a second clamping member 30, which is adapted to engage the front horizontal flange 31 of the axle 7 and which is adapted also to receive a lower nut 32, whereby the two clamping members 25 and 30 may be securely clamped onto the axle 7, as shown in Figures 1 and 3. The belt or strap 23 is a continuous loop, and extends through the two elongated apertures 22 and 28

By this novel construction, any downward movement of the chassis, with respect to the axle 7, and corresponding deflection of the spring 5 of the automobile, will merely buckle the strap or belt 23 since the latter is flexible and yielding, while a reverse movement of the axle 7 with respect to the chassis member 1, will draw downwardly the plunger 18 and hence will compress the helical spring 20, whereby the rebound of the main spring 5 is thus checked.

In my novel construction, the disc 19 fits within the cylindrical housing 10 snugly, while the rod 18 fits snugly within the opening 17, so that a compression of the air is obtained within the housing 10 and below the disc or piston 19, simultaneously with the compression of the spring 20. A vent opening 33 is provided in the upper end of the housing, so that the air will not be compressed above the disc or piston 19. The force of the compressed air below the piston 19 augments the action of the spring 20 in checking the rebound of the automobile.

It will now be apparent that I have devised a new and useful automobile rebound checking device, which embodies the features of advantage enumerated as desirable in the statement of the invention and the above description, and while I have, in the present instance, shown and described a preferred embodiment thereof which will give in practice, satisfactory and reilable results, it is to be understood that such embodiment is susceptible of modification in various particulars without departing from the spirit or scope of the invention, or sacrificing any of its advantages.

What is claimed is:

An automobile rebound checking device comprising a housing, having an upper terminal apertured flange therein, whereby said housing may be rigidly secured to the chassis of the automobile, and having a lower threaded terminal portion, a lower terminal cap threadedly secured to the lower threaded terminal portion of said housing, having a central opening therethrough, a plunger rod extending through said central opening and having an upper terminal disc secured to the upper end thereof, fitting snugly within said housing, and having a terminal strap socket at its lower end, a helical compression spring operatively interposed between said upper terminal disc of the plunger rod and the lower terminal cap of said housing, a horizontal bracket having a terminal clamping member and a second clamping member extending therethrough, adapted to engage the flanges of the automobile axle, and a flexible strap intermediate said upper socket and said lower socket.

CLARK O. FOUNTAIN.